(12) United States Patent
Goto et al.

(10) Patent No.: US 10,913,226 B2
(45) Date of Patent: Feb. 9, 2021

(54) METHOD FOR MANUFACTURING SPECTACLE LENS

(71) Applicant: HOYA LENS THAILAND LTD., Pathumthani (TH)

(72) Inventors: Takumi Goto, Tokyo (JP); Tsuyoshi Inaba, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 16/018,981

(22) Filed: Jun. 26, 2018

(65) Prior Publication Data

US 2018/0339474 A1 Nov. 29, 2018

Related U.S. Application Data

(63) Continuation of application No. PCT/JP2017/024245, filed on Jun. 30, 2017.

(30) Foreign Application Priority Data

Jun. 30, 2016 (JP) ................. 2016-131089

(51) Int. Cl.
  *B29D 11/00* (2006.01)
  *G02B 5/30* (2006.01)
  *G02C 7/12* (2006.01)
  *G02C 7/10* (2006.01)

(52) U.S. Cl.
  CPC .. *B29D 11/00884* (2013.01); *B29D 11/00644* (2013.01); *G02B 5/3016* (2013.01); *B29D 11/00653* (2013.01); *G02C 7/102* (2013.01); *G02C 7/12* (2013.01)

(58) Field of Classification Search
  CPC ........ B29D 11/00644; B29D 11/00884; G02C 7/12
  See application file for complete search history.

(56) References Cited

U.S. PATENT DOCUMENTS

| | | | |
|---|---|---|---|
| 6,245,399 B1 | 6/2001 | Sahouani et al. | |
| 8,649,081 B1 | 2/2014 | DeMeio et al. | |
| 2011/0268874 A1 | 11/2011 | Yajima | |
| 2012/0140323 A1 | 6/2012 | Yajima et al. | |
| 2013/0155507 A1* | 6/2013 | Ryu | C09B 47/00 359/487.02 |
| 2013/0194664 A1* | 8/2013 | Yajima | G02B 5/305 359/487.02 |
| 2013/0196077 A1 | 8/2013 | Yajima et al. | |

FOREIGN PATENT DOCUMENTS

| | | |
|---|---|---|
| CN | 1141605 C | 3/2004 |
| JP | 3144374 U | 8/2008 |
| JP | 2011-170339 A | 9/2011 |
| JP | 2012-226026 A | 11/2012 |
| JP | 2013-178490 A | 9/2013 |
| JP | 5555688 B2 | 7/2014 |
| JP | 2015-069045 A | 4/2015 |
| JP | 5938282 B2 | 6/2016 |

OTHER PUBLICATIONS

Oct. 3, 2017 Search Report issued in International Patent Application No. PCT/JP2017/024245.

* cited by examiner

*Primary Examiner* — Elizabeth A Burkhart
(74) *Attorney, Agent, or Firm* — Oliff PLC

(57) ABSTRACT

Provided is a spectacle lens endowed with high luminous transmittance as well as adequate polarizing function. A method for manufacturing a spectacle lens, comprising forming a polarizing layer by applying a coating liquid containing 0.04% by mass to 1.5% by mass of a dichroic pigment by a spin coating method at a speed of 200 rpm to 600 rpm on a rubbing-treated surface.

14 Claims, No Drawings

METHOD FOR MANUFACTURING SPECTACLE LENS

TECHNICAL FIELD

The present disclosure relates to a method for manufacturing a spectacle lens.

BACKGROUND ART

A technique of coating a coating liquid including a dichroic pigment on a lens substrate to form a polarizing layer (PTL 1) and a technique of forming a lens substrate layer on the front and back surfaces of a polarizing film by insert molding (PTL 2) have been disclosed as techniques for imparting a polarizing function to a spectacle lens.

The polarizing layer and the polarizing film described above each have a function of a polarizing filter, and as the degree of polarization increases, miscellaneous light is cut out and a clear view is obtained.

CITATION LIST

Patent Literature

[PTL 1] Japanese Patent No. 5555688
[PTL 2] Japanese Patent Application Publication No. 2015-69045

SUMMARY OF INVENTION

Technical Problem

However, a problem associated with the related art is that in order to increase the degree of polarization, the luminous transmittance of the spectacle lens needs to be reduced, and a demand for a spectacle lens having a low lens concentration (that is, a high luminous transmittance) and a polarizing function sufficient to reduce glare is not met.

One embodiment of the present disclosure provides a method of manufacturing a spectacle lens having high luminous transmittance and high polarizing function.

Solution to Problem

The present specification discloses a method for manufacturing a spectacle lens, the method including forming a polarizing layer by applying a coating liquid containing 0.04% by mass to 1.5% by mass of a dichroic pigment by a spin coating method at a speed of 200 rpm to 600 rpm on a rubbing-treated surface.

Advantageous Effects of Invention

According to the above-described embodiment, it is possible to provide a method of manufacturing a spectacle lens having high luminous transmittance and high polarizing function.

DESCRIPTION OF EMBODIMENTS

Hereinafter, embodiments of the present disclosure will be described in detail.

First Embodiment

The present embodiment relates to a method for manufacturing a spectacle lens, the method including forming a polarizing layer by applying a coating liquid containing 0.04% by mass to 1.5% by mass of a dichroic pigment by a spin coating method at a speed of 200 rpm to 600 rpm on a rubbing-treated surface.

This embodiment will be described hereinbelow in greater detail.

<Coating Liquid>

The coating liquid contains at least a dichroic pigment. The polarizing property of the dichroic pigment is usually expressed by mainly uniaxial orientation of the dichroic pigment. In order to uniaxially orient the dichroic pigment, rubbing treatment on the surface to which the coating liquid containing dichroic pigment may be applied.

(Dichroic Pigment)

"Dichroic", as referred to herein, means a property that the color of transmitted light varies depending on the direction of propagation because the medium has anisotropy of selective absorption for light. The dichroic pigment has a property that light absorption becomes strong in a certain direction in which the pigment molecule is present with respect to the polarized light, and light absorption becomes small in the direction orthogonal thereto. Further, among the dichroic pigments, those that develop a liquid crystal state in a certain concentration-temperature range when water is used as a solvent are known. Such a liquid crystal state is called a lyotropic liquid crystal. Where the pigment molecules can be aligned in a specific direction by using the liquid crystal state of the dichroic pigment, it becomes possible to develop stronger dichroism. A dichroic pigment can be uniaxially oriented by coating a coating liquid including the dichroic pigment on the rubbed surface, whereby a polarizing layer having good polarization property can be formed. The dichroic pigment is not particularly limited, and various dichroic pigments ordinarily used for a polarizing member such as a polarizing lens can be exemplified. Specific examples thereof include azo, anthraquinone, merocyanine, styryl, azomethine, quinone, quinophthalone, perylene, indigo, tetrazine, stilbene, and benzidine pigments. Pigments described in U.S. Pat. No. 2,400,877 (Specification) and Japanese Translation of PCT Application No. 2002-527786 may be used. For example, materials including a combination of polychromatic pigment molecules and a molecular matrix having lyotropic liquid crystallinity and orienting and holding the polychromatic pigment molecules in a predetermined direction may be used.

In order to obtain a high degree of polarization, the coating liquid may be an aqueous coating liquid including a dichroic pigment. The coating liquid may be a solution or a suspension, but may be a solution.

The "aqueous coating liquid" means a liquid including a solvent containing water as a main component. By using the aqueous coating liquid, a lyotropic liquid crystal state of the dichroic pigment can be formed, the dichroic pigment is easily oriented to the rubbed surface after the application, and the degree of polarization of the spectacle lens can be improved.

The amount of water in the solvent of the coating liquid may be 60% by mass to 100% by mass, may be 75% by mass to 100% by mass, and may be 90% by mass to 100% by mass.

The amount of the dichroic pigment in the coating liquid is 0.04% by mass to 1.5% by mass, may be 0.1% by mass to 0.5% by mass, and may be 0.2% by mass to 0.3% by mass. By setting the amount of the dichroic pigment in such a range, it is possible to obtain a spectacle lens having a high degree of polarization while having high luminous transmittance. In addition, variations in the luminous transmittance and the degree of polarization of the spectacle lens obtained by spin coating can be reduced.

The aqueous coating liquid for forming the polarizing layer may include other components in addition to the dichroic pigment. As other components, pigments other than dichroic pigments can be exemplified, and by blending such pigments, a polarizing layer having a desired hue can be formed. From the viewpoint of further improving coatability and the like, additives such as a rheology modifier, an adhesion promoter, a plasticizer, a leveling agent, and the like may be blended as necessary.

<Rubbing Treatment>

The "rubbing treatment", as referred to herein, is a treatment of imparting orientation to the surface of a workpiece. The "rubbed surface", as referred to herein, is the surface subjected to the rubbing treatment. Examples of the rubbing treatment include physical methods of imparting orientation by rotating, on the surface to be treated, a roll in which nylon fibers are implanted on the surface or a roll having a rubbing cloth attached to the surface, and chemical methods of imparting orientation by irradiating with high-energy light such as UV.

The rubbing treatment may be directly performed on the surface of a lens substrate or a hard coat layer, but from the viewpoint of better manifesting the polarization property of the dichroic pigment, the rubbing treatment may be performed on the surface of the alignment layer described hereinbelow.

(Lens Substrate)

The rubbed surface on which the polarizing layer is to be formed is formed directly on the lens substrate or indirectly via another layer.

As the lens substrate, various kinds of lens substrates commonly used for spectacle lenses such as a plastic lens substrate and a glass lens substrate can be used without any limitation. From the viewpoints of light weight and resistance to cracking, the lens substrate may be a plastic lens substrate. Specific examples of resins for forming the plastic lens substrate include, but are not limited to, styrene resins including (meth)acrylic resins, polycarbonate resins, allyl resins, allyl carbonate resins such as diethylene glycol bisallyl carbonate resin (CR-39), vinyl resins, polyester resins, polyether resins, urethane resins obtained by reacting an isocyanate compound with a hydroxy compound such as diethylene glycol, thiourethane resins obtained by reacting an isocyanate compound with a polythiol compound, and transparent resins obtained by curing a polymerizable composition including a (thio)epoxy compound having one or more disulfide bonds in a molecule. Lens substrates which have not been dyed (colorless lenses) may be used, or those which have been dyed (dyed lens) may be used. The refractive index of the lens substrate is, for example, about 1.60 to 1.75. However, the refractive index of the lens substrate is not limited to this range and may fall within the range or be above or below the range.

The spectacle lens can be of various types inclusive of a single focus lens, a multifocal lens, a progressive power lens and the like. The type of the lens is determined by the surface shape of both sides of the lens substrate. In addition, the lens substrate surface may be any of a convex surface, a concave surface, and a flat surface. In ordinary lens substrates and spectacle lenses, the object-side surface is a convex surface and the eyeball-side surface is a concave surface. However, the present disclosure is not limited to this configuration. From the viewpoint of better exerting the polarization property of the polarizing layer, the surface on which the below-described polarizing layer may be the convex surface of the lens substrate.

A polarizing layer is formed directly or indirectly via another layer on the lens substrate. The other layer formed herein can be exemplified by a hard coat layer. By providing the hard coat layer, scratch resistance (abrasion resistance) can be imparted to the spectacle lens and the durability (strength) of the spectacle lens can also be enhanced. Materials suitable for the hard coat layer are exemplified by an acrylic resin, a melamine resin, a urethane resin, an epoxy resin, a polyvinyl acetal resin, an amino resin, a polyester resin, a polyamide resin, a vinyl alcohol resin, a styrene resin, a silicone resin, and mixtures or copolymers thereof. An example of the hard coat layer is a silicone resin. For example, the hard coat layer can be formed by coating a coating composition including metal oxide fine particles and an organosilicon compound by a dipping method, a spinner method, a spray method, a flow method, or the like and then heating at a temperature of 40° C. to 200° C. for several hours, followed by drying and curing. The coating composition may include components such as organosilicon compounds and metal oxide particles which will be described hereinbelow. Note that some lens substrates are commercially available with a hard coat layer attached thereto, and such a lens substrate may also be used in the manufacturing method according to the present disclosure. Further, as the above-mentioned other layer can be also exemplified by the below-described alignment layer.

(Alignment Layer)

The alignment layer is provided for orienting the dichroic pigment. The alignment layer is usually provided directly on the lens substrate surface or indirectly via another layer. A layer that can be formed between the lens substrate and the alignment layer can be exemplified by the hard coat layer described hereinabove. The thickness of the alignment layer is usually about 0.02 µm to 5 µm, may be 0.05 µm to 0.5 µm.

The alignment layer is formed, for example, by forming a film containing an inorganic oxide and then subjecting the surface to a rubbing treatment.

The film may be formed by depositing a film forming material by a well-known film forming method such as vapor deposition, sputtering, and the like or may be formed by a known coating method such as a dipping method, a spin coating method, and the like. Examples of the materials for the above film include inorganic oxides, more specifically, metals, semimetals, and also oxides, complexes or compounds thereof can be used. Among them, from the viewpoint of easiness of imparting functionality as an alignment layer, it may be silicon oxides such as SiO and $SiO_2$, and among them, from the viewpoint of reactivity with a silane coupling agent which will be described hereinbelow, it may be $SiO_2$. Meanwhile, an alignment layer formed by a coating method can be exemplified by a sol-gel film including an inorganic oxide sol. Examples of a coating liquid using for forming the sol-gel film is a coating liquid including an alkoxysilane and/or a hexaalkoxydisiloxane. Examples of the alkoxysilane include tetraalkoxysilane such as tetraethoxysilane, tetramethoxysilane, tetraisopropoxysilane and the like; alkyltrialkoxysilanes such as methyltrimethoxysilane, methyltriethoxysilane, methyltriisopropoxysilane, and the like. Examples of the hexaalkoxydisiloxane include hexaethoxydisiloxane, xamethoxydisiloxane and the like.

After forming the film, a rubbing treatment is performed. The rubbing treatment method is as described above.

<Formation of Polarizing Layer>

(Coating Liquid Application)

In one embodiment of the present disclosure, the coating liquid is applied onto the rubbing-treated surface by a spin coating method.

Spin coating can be performed, for example, by placing a lens substrate having a rubbed surface in a spin coater.

The rotation can be performed, for example, about the geometric center of the lens substrate as a rotation center.

The rotation speed during application in spin coating may be 200 rpm to 600 rpm, may be 250 rpm to 500 rpm, and may be 285 rpm to 450 rpm.

The rotation speed during application in spin coating may be 200 rpm or more, may be 250 rpm or more, and may be 270 rpm or more, and it may be 600 rpm or less, may be 500 rpm or less, may be 450 rpm or less, may be 400 rpm or less, and may be 300 rpm or less.

The holding time at this rotation speed, for example, about 40 sec to 50 sec.

The coating liquid may be supplied to, for example, the geometric center portion of the rotating lens substrate. Further, the coating may be performed by moving the coating liquid horizontally on a rotating lens substrate along a straight line connecting the geometric center portion and the peripheral portion of the lens substrate, so that the coating liquid supply point draws a spiral locus on the lens substrate.

At the start of supplying the coating liquid (at the time of liquid discharge), the rotation is performed for about 8 sec at a rotation speed lower than the rotation speed at the time of coating in order to prevent the applied coating liquid from being repelled by the rubbed surface on the lens substrate.

After the application, in order to sweep the coating liquid, the rotation speed may be increased to about 1000 rpm and the rotation be performed for about 12 sec.

The thickness of the polarizing layer is usually about 0.05 μm to 5 μm but is not particularly limited. The thickness of the polarizing layer may be 0.1 μm or more, may be 0.5 μm or more, and may be 0.8 μm or more, and it may be 4 μm or less, may be 3 μm or less, and may be 2 μm or less. A silane coupling agent described hereinbelow usually penetrates into the polarizing layer and is substantially contained in the polarizing layer.

(Water-Insolubilization Treatment)

When a water-soluble pigment is used as the dichroic pigment, in order to enhance the film stability, water-insolubilization treatment may be performed after the coating liquid has been coated and dried. The water-insolubilization treatment can be performed, for example, by ion-exchanging the terminal hydroxyl group of the molecule of the dichroic pigment or by creating a chelate state between the dichroic pigment and a metal ion. For that purpose, a method of immersing the formed polarizing layer in a metal salt aqueous solution may be used. The metal salt is not particularly limited, and examples thereof include $AlCl_3$, $BaCl_2$, $CdCl_2$, $ZnCl_2$, $FeCl_2$, $SnCl_3$. After the water-insolubilization treatment, the surface of the polarizing layer may be further dried.

(Immobilization Treatment)

The polarizing layer may be performed immobilization treatment of the dichroic pigment in order to enhance film strength and film stability. When a water-soluble pigment is used as the dichroic pigment, the immobilization treatment may be performed after the above-described water-insolubilization treatment. By the immobilization treatment, the alignment state of the dichroic pigment in the polarizing layer can be fixed.

(Silane Coupling Agent Treatment)

The immobilization treatment may be performed by treating the surface of the polarizing layer with a silane coupling agent. The silane coupling agent treatment can be performed, for example, by applying a silane coupling agent solution having a concentration of about 1% by mass to 15% by mass, or about 1% by mass to 10% by mass, to the surface of the polarizing layer. The solvent used for preparing the above solution may be an aqueous solvent, may be water, or a mixed solvent of water and alcohol (methanol, ethanol, and the like), and may be water. In the present disclosure, the aqueous solvent is assumed to refer to a solvent including at least water. The aqueous solvent may be a liquid including a solvent including water as a main component. The content of water may be from 60% by mass to 100% by mass, may be from 75% by mass to 100% by mass, and may be from 90% by mass to 100% by mass in the aqueous medium.

The solvent can be applied by known means such as a dipping method, a spin coating method, a spray method, or the like. By allowing the member including the lens substrate and the polarizing layer to stay for a predetermined time in a heating furnace or the like during the immobilization treatment, the immobilization effect can be further enhanced. The environment temperature in the furnace can be determined according to the type of the silane coupling agent to be used, and is usually from room temperature to 120° C., may be 40° C. to 100° C., and may be from 50° C. to 80° C. The standing time is usually about 5 min to 3 h.

The silane coupling agent may be an epoxysilane (epoxy group-containing silane coupling agent) and an aminosilane (amino group-containing silane coupling agent). From the viewpoint of the immobilization effect, silane coupling treatment (epoxysilane treatment) by coating at least the epoxy group-containing silane coupling agent solution on the surface of the polarizing layer may be performed, and the epoxysilane treatment may be performed after coating an amino group-containing silane coupling agent (aminosilane treatment). This is apparently because due to the molecular structure thereof, an aminosilane is more easily interposed between the molecules of uniaxially oriented dichroic pigment, as compared with an epoxysilane.

The silane coupling agent has a structure represented, for example, by the formula: $R—Si(OR')_3$ (wherein plural R's may be the same or different).

The R is usually an organic functional group, and the epoxysilane (epoxy group-containing silane coupling agent) includes an epoxy group in the functional group represented by R. The epoxy group is usually bonded to Si via a divalent linking group. The divalent linking group can be exemplified by a linking group contained in a specific example compound described hereinbelow.

Meanwhile, the R' is usually an alkyl group, which undergoes hydrolysis in an aqueous solvent to produce silanol (Si—OH). The number of carbon atoms in the alkyl group represented by R' is, for example, 1 to 10, may be 1 to 3.

Specific examples of epoxysilanes include glycidoxy group-containing trialkoxysilanes such as γ-glycidoxypropyltrimethoxysilane (γ-GPS), γ-glycidoxypropylmethyldiethoxysilane, and the like; epoxyalkylalkoxysilanes such as β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane and the like; and amino group-containing alkoxysilanes such as N-(β-aminoethyl)-γ-aminopropyltrimethoxysilane, N-(β-aminoethyl)-γ-aminopropylmethyldimethoxysilane, γ-aminopropylmethyldimethoxysilane, γ-aminopropylmethyldiethoxysilane, γ-aminopropyltrimethoxysilane, γ-aminopropyltriethoxysilane, N-(β-aminoethyl)-γ-aminopropylmethyldimethoxysilane, N-(β-aminoethyl)-γ-aminopropylmethyldiethoxysilane, and the like.

The silane coupling agents may be used singly or in combination of two or more thereof. The silane coupling agent excessively attached to the outermost surface can be removed by rinsing, with pure water, deionized water or the like, the surface of the polarizing layer after the application of the silane coupling agent. A member including the polarizing layer after applying the silane coupling agent can be subjected to heat treatment. The heat treatment can be performed, for example, by disposing the member in a furnace having a furnace temperature of 45° C. to 145° C., or 50° C. to 90° C.

<Formation of Functional Layer>

The spectacle lens obtained by one embodiment of the present disclosure may have the polarizing layer as the outermost layer on the object-side surface, but one or more functional layers may be further provided on a layer more distant from the lens substrate than the polarizing layer (that is, positioned on the object side). Two or more such functional layers may be provided. Examples of the optional functional layer include various functional layers such as a well-known hard coat layer, a water repellent layer, and an antireflection layer (multilayer antireflection film). As an example, the hard coat layer will be described below.

(Hard Coat Layer)

From the viewpoint of improving the durability of the spectacle lens and achieving optical characteristics at the same time, the hard coat layer may have a thickness in the range of 0.5 μm to 10 μm. From the viewpoint of improving the durability of the spectacle lens, the hard coat layer may include an organosilicon compound and metal oxide particles.

As a embodiment of the organosilicon compound, an organosilicon compound represented by the following general formula (I) or a hydrolyzate thereof can also be mentioned.

$$(R^1)_a(R^3)_b Si(OR^2)_{4-(a+b)} \quad (I)$$

In the general formula (I), $R^1$ represents an organic group having a glycidoxy group, an epoxy group, a vinyl group, a methacryloxy group, an acryloxy group, a mercapto group, an amino group, a phenyl group, and the like; $R^2$ represents an alkyl group having 1 to 4 carbon atoms, an acyl group having 1 to 4 carbon atoms or an aryl group having 6 to 10 carbon atoms; $R^3$ represents an alkyl group having 1 to 6 carbon atoms or an aryl group having 6 to 10 carbon atoms; a and b each are 0 or 1.

The alkyl group having 1 to 4 carbon atoms which is represented by $R^2$ is a linear or branched alkyl group, and specific examples thereof include a methyl group, an ethyl group, a propyl group, a butyl group, and the like.

The acyl group having 1 to 4 carbon atoms which is represented by $R^2$ is exemplified by an acetyl group, a propionyl group, an oleyl group, a benzoyl group, and the like.

The aryl group having 6 to 10 carbon atoms which is represented by $R^2$ is exemplified by a phenyl group, a xylyl group, a tolyl group, and the like.

The alkyl group having 1 to 6 carbon atoms represented by $R^3$ is a linear or branched alkyl group, and specific examples thereof include a methyl group, an ethyl group, a propyl group, a butyl group, a pentyl group, a hexyl group, and the like.

Specific examples of the compound represented by the general formula (I) include methyl silicate, ethyl silicate, n-propyl silicate, i-propyl silicate, n-butyl silicate, sec-butyl silicate, t-butyl silicate tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane, ethyltrimethoxysilane, ethyltriethoxysilane, vinyltrimethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl) γ-aminopropyltrimethoxysilane, N-(β-aminoethyl) γ-aminopropylmethyldimethoxysilane, γ-aminopropylmethyldimethoxysilane, N-(β-aminoethyl) γ-aminopropyltriethoxysilane, N-(β-aminoethyl) γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, methylvinyldimethoxysilane, methylvinyldiethoxysilane, and the like. Since the organosilicon compound represented by the general formula (I) has a curable group, it is possible to form a hard coat layer as a cured layer by performing curing after coating.

The metal oxide particles contained in the hard coat layer can contribute to adjustment of the refractive index and increase in hardness of the hard coat layer. Specific examples include particles of tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), and antimony oxide ($Sb_2O_5$), and metal oxide particles can be used singly or in combination of two or more thereof. From the viewpoint of achieving both scratch resistance and optical properties, the particle size of the metal oxide particles may be in the range of 5 nm to 30 nm. For the same reason, the content of the metal oxide particles in the hard coat layer can be appropriately set in consideration of the refractive index and hardness, but this content is usually from about 5% by mass to 80% by mass based on the solid content of the hard coat composition. Further, from the viewpoint of dispersibility in the hard coat layer, the above metal oxide particles may be colloidal particles.

The hard coat layer is formed by coating a hard coat composition prepared by mixing the above-mentioned components and, if necessary, optional components such as an organic solvent, a surfactant (leveling agent), and the like, on the surface to be coated, and performing curing treatment (light irradiation, heating, and the like) corresponding to the curable groups. In the embodiment where the hard coat composition is cured by heating, the heating temperature (atmosphere temperature at which the heat treatment is performed) may be less than 100° C., and may be 95° C. or less. The heating temperature is, for example, 80° C. or higher, but may be set according to the type of the curable compound, and may be lower than 80° C. As a means for coating the hard coat composition, usual methods such as a dipping method, a spin coating method, a spray method, and the like can be used.

[Spectacle Lens]
<Lamination Order>

As described above, in the spectacle lens obtained by the manufacturing method according to the embodiment of the present disclosure, the lamination order of layers is not particularly limited. In one embodiment of the present embodiment, a polarizing layer is included as a layer closer to the lens substrate.

In the eyeglass lens according to one embodiment of the present disclosure, the lens substrate, the polarizing layer and the hard coat layer may be laminated in this order, and the lens substrate, the hard coat layer, the alignment layer, the polarizing layer, and the hard coat layer may be laminated in this order. Where the abovementioned layers are present on at least one side of the lens substrate, the layers can exhibit a sufficient function.

The luminous transmittance of the spectacle lens according to an embodiment of the present disclosure may be more than 40%, may be more than 50%, may be more than 60%, and may be more than 70%. The upper limit of the luminous transmittance is not particularly limited and is, for example, 99% or less, may be 98% or less, may be 95% or less, and may be 90% or less.

The luminous transmittance is measured by the method described in the examples.

The degree of polarization of the spectacle lens according to one embodiment of the present disclosure is 10% to 60%, may be 10% to 50%, may be 10% to 40%, may be 10% to 30%, and may be 15% to 20%. Where the degree of polarization is set to 10% or more, the user wearing spectacles using this spectacle lens can recognize the polarization performance more remarkably. Although the upper limit of the degree of polarization is not particularly limited, it has been conventionally assumed that the luminous transmittance and the degree of polarization of a spectacle lens are in a trade-off relationship, and in order to increase the luminous transmittance, the degree of polarization needs to be lowered. However, with the manufacturing method according to the embodiment of the present disclosure, it is possible to realize a spectacle lens with enhanced luminous transmittance while maintaining the degree of polarization at a predetermined level.

The degree of polarization is measured by the method described in the examples.

Second Embodiment

In the first embodiment described above, a method of manufacturing a so-called "polarizing lens" in which a polarizing layer is laminated on the surface of a lens substrate, among spectacle lenses, has been described, but in the present embodiment, the functional layer is a photochromic layer, that is, described hereinbelow is a method for manufacturing a so-called "polarizing and dimming lens" formed by laminating a polarizing layer and a photochromic layer on the surface of a lens substrate.

The <coating liquid>, <rubbing treatment>, <formation of the polarizing layer>, <formation of the functional layer> are the same as those in the above-described embodiment and will not be described.

<Lamination Order>

In the spectacle lens according to one embodiment of the present disclosure, the order of lamination is not particularly limited. In the present embodiment, the polarizing layer and the photochromic layer are laminated with an intermediate layer being interposed therebetween. In one embodiment of the present embodiment, the polarizing layer is included as a layer closer to the lens substrate, that is, the lens substrate, the polarizing layer, the intermediate layer, and the photochromic layer are laminated in this order. In another embodiment, a photochromic layer is included as a layer closer to the lens substrate, that is, the lens substrate, the photochromic layer, the intermediate layer, and the polarizing layer are laminated in this order. From the viewpoint of the response speed of coloring-fading of the photochromic layer, the photochromic layer may be included as a layer close to the object side (incident side of light). From this viewpoint, the former configuration (lamination order: lens substrate, polarizing layer, intermediate layer, photochromic layer) may have better. Where the abovementioned layers are present on at least one side of the lens substrate, the layers can exhibit a sufficient function.

<Formation of Photochromic Layer>

In one embodiment of the present disclosure, a photochromic layer including a photochromic pigment is further formed as an upper layer or a lower layer of the polarizing layer. The lower layer means a layer nearer to the lens substrate, and the upper layer means a layer farther from the lens substrate.

The photochromic layer may be layered on the polarizing via an intermediate layer described hereinbelow.

(Photochromic Pigment)

The photochromic layer includes at least a photochromic pigment. As the photochromic pigment, for example, a photochromic compound such as a fulgimide compound, a spirooxazine compound, a chromene compound, or the like can be used without any limitation. Among these photochromic compounds, the chromene compound may be used because the durability of the photochromic characteristic is higher than in other photochromic compounds and the increase in coloring density and fading rate of the photochromic characteristic is particularly high as compared with other photochromic compounds. Further, even among the chromene compounds, the compounds having a molecular weight of 540 or more may be used since the increase in coloring density and fading rate of the photochromic characteristic is especially high as compared with other chromene compounds. A plurality of kinds of photochromic compounds can be used by appropriately mixing two or more kinds thereof in order to develop an appropriate color tone.

Among the chromene compounds, the chromene compounds having the following structures may have better.

[C1]

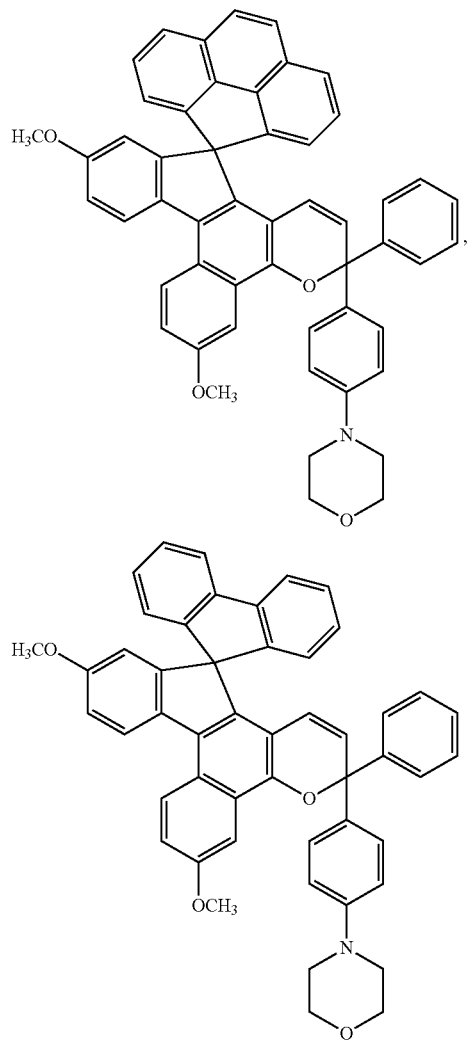

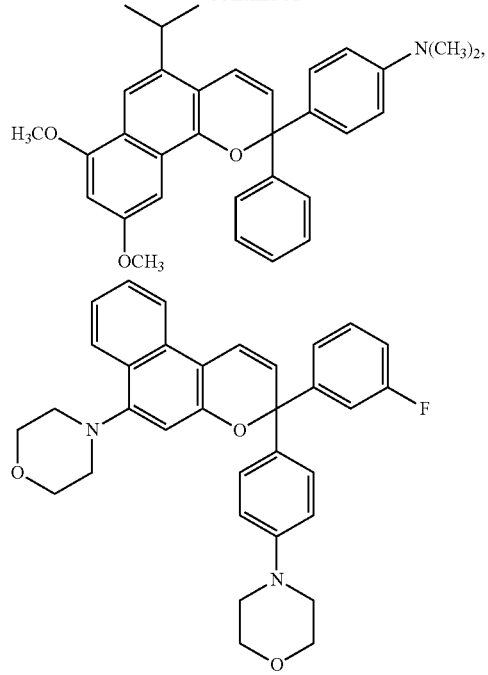

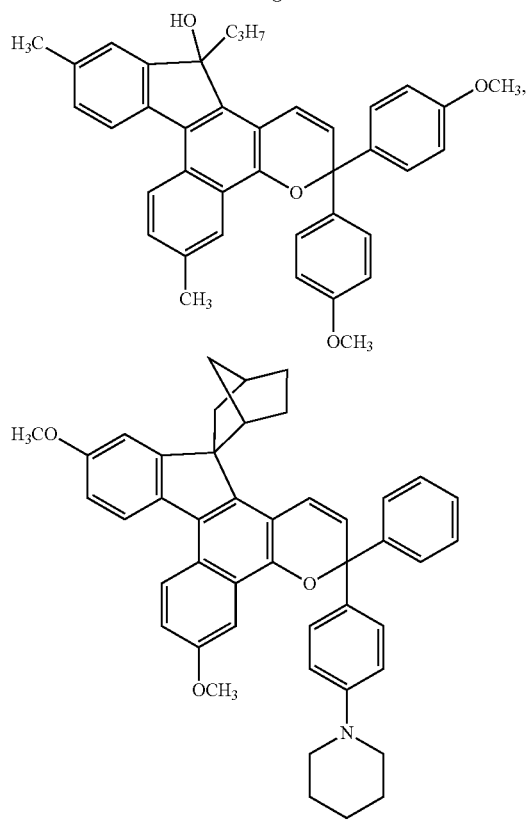

The photochromic layer may be formed by coating, on the intermediate layer, a curable composition (curable composition for forming a photochromic layer) including a photochromic pigment including a photochromic pigment, and curing the composition. The curable composition refers to a composition including at least a curable compound. The curable composition for forming a photochromic layer may include the photochromic pigment at 0.01 parts by mass to 20 parts by mass, or at 0.1 parts by mass to 10 parts by mass, based on 100 parts by mass of the curable compound.

(Curable Compound)

The curable compound may be a compound having a property of being cured (polymerized) by a curing treatment such as light irradiation, heating, or the like. Acrylic compounds may have better from the viewpoints of easy availability and good curability and the like, and compounds having a radically polymerizable group selected from (meth)acryloyl groups and (meth)acryloyloxy groups may have better. Incidentally, (meth)acryloyl represents both acryloyl and methacryloyl, and (meth)acryloyloxy represents both acryloyloxy and methacryloyloxy.

In order to improve the properties of cured products such as the ease of hardness adjustment, solvent resistance and hardness after film formation, heat resistance and the like, or photochromic properties such as coloring density and fading rate, as the curable compound, a combination of a monomer exhibiting an L-scale Rockwell hardness of 60 or more as a homopolymer (hereinafter sometimes referred to as high-hardness monomer) and a monomer exhibiting an L-scale Rockwell hardness of 40 or less as a homopolymer (hereinafter sometimes referred to as low-hardness monomer) may be used. The L-scale Rockwell hardness means the hardness measured in accordance with JIS B 7726. By performing such a measurement on a homopolymer of each monomer, it can be easily determined whether or not the hardness condition is satisfied. Specifically, the confirmation can be easily made by polymerizing the monomer to obtain a cured product having a thickness of 2 mm, keeping the cured product for 1 day in a room at 25° C., and then measuring the L-scale Rockwell hardness by using a Rockwell hardness tester. The polymer to be used for measuring the L-scale Rockwell hardness is obtained by cast polymerization under the condition that 90% or more of the polymerizable groups of the charged monomer are polymerized. The L-scale Rockwell hardness of the cured product polymerized under such conditions is measured as an almost constant value. The high-hardness monomer has an effect of improving the solvent resistance, hardness, heat resistance and the like of the cured product after curing. In order to make this effect more effective, a curable compound with an L-scale Rockwell hardness of a homopolymer of 65 to 130 may have better. Such a high-hardness monomer may be usually a compound having 2 to 15, or 2 to 6 radically polymerizable groups.

Specific examples of the high hardness monomer include trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, caprolatatone-modified dipentaerythritol hexaacrylate, ditrimethylolpropane tetraacrylate, and the like.

Specific examples of the high-hardness monomer include tetrafunctional polyester oligomers having a molecular weight of 2500 to 3500 (Daicel-UCB Company, Ltd., EB80 and the like), tetrafunctional polyester oligomers having a molecular weight of 6000 to 8000 (Daicel-UCB Company, Ltd., EB450 and the like), hexafunctional polyester oligomers having a molecular weight of 45,000 to 55,000 (Daicel-UCB Company, Ltd., EB1830 and the like), tetrafunctional polyester oligomers having a molecular weight of 10,000 (DKS Co. Ltd., GX8488B, and the like), and the like.

Specific examples of the high-hardness monomer include bisphenol A dimethacrylate, 2,2-bis(4-methacryloyloxyethoxyphenyl)propane, 2,2-bis(3,5-dibromo-4-methacryloyloxyethoxyphenyl)propane, and the like.

Specific examples of the high-hardness monomer also include ethylene glycol diacrylate, ethylene glycol dimethacrylate, 1,4-butylene glycol dimethacrylate, 1,9-nonylene glycol dimethacrylate, neopentylene glycol dimethacrylate, neopentylene glycol diacrylate, and the like.

Specific examples of the high-hardness monomer also include diethylene glycol dimethacrylate, triethylene glycol dimethacrylate, tetraethylene glycol dimethacrylate, tripropylene glycol dimethacrylate, tetrapropylene glycol dimethacrylate, and the like.

Specific examples of the high-hardness monomer also include bisphenol A diglycidyl methacrylate, ethylene glycol bisglycidyl methacrylate, glycidyl methacrylate, and the like. Depending on the combination of substituents, even the above-mentioned compounds can have an L-scale Rockwell hardness of the homopolymer of less than 60, but in such a case, these compounds are classified into low-hardness monomers or medium-hardness monomers.

In order to strengthen the cured product and to improve the fading rate of the photochromic compound, the curable compound includes a low-hardness monomer. Specific examples of the low-hardness monomer include alkylene glycol di(meth)acrylates such as trialkylene glycol diacrylates, tetraalkylene glycol diacrylates, nonaalkylene glycol diacrylates, nonaalkylene glycol dimethacrylates, and the like.

Specific examples of the low-hardness monomer also include 2,2-bis(4-acryloyloxypolyethylene glycol phenyl)propane having an average molecular weight of 776 and the like. Specific examples of the low-hardness monomer also include polyalkylene glycol (meth)acrylates such as polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1000, polypropylene glycol methacrylate having an average molecular weight of 375, polypropylene methacrylate having an average molecular weight of 430, polypropylene methacrylate having an average molecular weight of 622, methyl ether polypropylene glycol methacrylate having an average molecular weight of 620, polytetramethylene glycol methacrylate having an average molecular weight of 566, octylphenyl ether polyethylene glycol methacrylate having an average molecular weight of 2034, nonyl ether polyethylene glycol methacrylate having an average molecular weight of 610, methyl ether polyethylene thioglycol methacrylate having an average molecular weight of 640, perfluoroheptyl ethylene glycol methacrylate having an average molecular weight of 498, and the like. Specific examples of the low-hardness monomer also include stearyl methacrylate, lauryl methacrylate, ethylhexyl methacrylate, methyl acrylate, ethyl acrylate, butyl acrylate, lauryl acrylate, and the like. Among these low-hardness monomers, methyl ether polyethylene glycol methacrylate having an average molecular weight of 475, methyl ether polyethylene glycol methacrylate having an average molecular weight of 1000, trialkylene glycol diacrylates, tetraalkylene glycol diacrylates, nonaalkylene glycol diacrylates, methyl acrylate, ethyl acrylate, butyl acrylate, and lauryl acrylate may have better.

Depending on the combination of substituents, even the above-mentioned compounds can have an L-scale Rockwell hardness of the homopolymer of 40 or more, but in such a case, these compounds are classified into the above-described high-hardness monomers or the below-described medium-hardness monomers. Examples of monomers which are neither high-hardness monomers nor low-hardness monomers, that is, monomers for which the L-scale Rockwell hardness of the individual cured product is more than 40 and less than 60 (hereinafter sometimes referred to as medium-hardness monomers), include: bifunctional (meth)acrylates such as polytetramethylene glycol dimethacrylate having an average molecular weight of 650, polytetramethylene glycol dimethacrylate having an average molecular weight of 1400, bis(2-methacryloyloxyethylthioethyl)sulfide and the like; polyallyl compounds such as diallyl phthalate, diallyl isophthalate, diallyl tartrate, epoxy diallyl succinate, diallyl fumarate, diallyl chlorendate, diallyl hexaphthalate, allyl diglycol carbonate, and the like; polythioacrylic acid and polythiomethacrylic acid ester compounds such as 1,2-bis(methacryloylthio)ethane, bis(2-acryloylthioethyl)ether, 1,4-bis(methacryloylthiomethyl) benzene, and the like; unsaturated carboxylic acids such as acrylic acid, methacrylic acid, maleic anhydride, and the like; acrylic acid and methacrylic acid ester compounds such as methyl methacrylate, butyl methacrylate, benzyl methacrylate, phenyl methacrylate, 2-hydroxyethyl methacrylate, biphenyl methacrylate, and the like; fumaric acid ester compounds such as diethyl fumarate, diphenyl fumarate, and the like; thioacrylic acid and thiomethacrylic acid ester compounds such as methyl thioacrylate, benzyl thioacrylate, benzyl thiomethacrylate, and the like; vinyl compounds such as styrene, chlorostyrene, methyl styrene, vinyl naphthalene, α-methyl styrene dimer, bromostyrene, divinylbenzene, vinyl pyrrolidone, and the like; and radically polymerizable monofunctional monomers such as (meth)acrylates with 6 to 25 carbon atoms in a hydrocarbon chains having an unsaturated bond in a molecule, such as oleyl methacrylate, nerol methacrylate, geraniol methacrylate, linalool methacrylate, farnesol methacrylate, and the like. These medium-hardness monomers can also be used, and high-hardness monomers, low-hardness monomers and medium-hardness monomers can be used in a suitable mixture thereof. In order to improve the balance of cured product properties such as solvent resistance, hardness and heat resistance of the cured product of the curable composition for forming a photochromic layer, or the photochromic properties such as coloring density and fading rate, the content of the low-hardness monomer may be 5% by mass to 70% by mass and the content of the high-hardness monomer may be 5% by mass to 95% by mass in the curable composition. Further, a monomer having three or more radically polymerizable groups may be compounded, as a high-hardness monomer to be compounded, at at least 5% by mass or more among other curable compounds.

(Polymerization Initiator)

A curable composition for forming a photochromic layer usually includes a polymerization initiator. Depending on the polymerization method, the polymerization initiator can be appropriately selected from known photopolymerization initiators and thermal polymerization initiators.

The photopolymerization initiator is not particularly limited, and examples thereof include benzoin, benzoin methyl ether, benzoin butyl ether, benzophenol, acetophenone, 4,4'-dichlorobenzophenone, diethoxyacetophenone, 2-hydroxy-2-methyl-1-phenylpropane-1-one, benzyl methyl ketal, 1-(4-isopropylphenyl)-2-hydroxy-2-methylpropane-1-one, 1-hydroxycyclohexylphenyl ketone, 2-isopropyl thioxanthone, bis(2,6-dimethoxybenzoyl-2,4,4-trimethyl)pentylphosphine oxide, bis(2,4,6-trimethylbenzoyl)phenylphosphine oxide, 2,4,6-trimethylbenzoyldiphenylphosphine oxide, 2-benzyl-2-dimethylamino-1-(4-morpholinophenyl)-butanone-1, and the like. 1-hydroxycyclohexylphenyl ketone, 2-isopropyl thioxanthone, bis(2,6-dimethoxybenzoyl)-2,4,4-trimethylpentylphosphine oxide, bis(2,4,6-trimethylbenzoyl)phenylphosphine oxide, and 2,4,6-trimethylbenzoyldiphenylphosphine oxide may have better. A plurality of these photopolymerization initiators may be used in a suitable mixture thereof. The amount of the photopolymerization initiator to be blended with respect to the total amount of the curable composition for forming a photochromic layer may be usually 0.001 parts by mass to 5 parts by mass, may be 0.1 parts by mass to 1 part by mass, per 100 parts by mass of the curable compound.

When the photochromic layer is formed by thermal polymerization, examples of suitable thermal polymerization initiators include: diacyl peroxides such as benzoyl peroxide, β-chlorobenzoyl peroxide, decanoyl peroxide, lauroyl peroxide, acetyl peroxide, and the like; peroxyesters such as t-butyl peroxy-2-ethylhexanoate, t-butyl peroxydicarbonate, cumyl peroxyneodecanate, t-butyl peroxybenzoate, and the like; percarbonates such as diisopropyl peroxydicarbonate, di-2-ethylhexyl peroxydicarbonate, di-sec-butyloxycarbonate, and the like; and azo compound such as 2,2'-azobisisobutyronitrile, 2,2'-azobis(4-dimethylvaleronitrile), 2,2'-azobis(2-methylbutyronitrile), 1,1,-azobis(cyclohexane-1-carbonitrile), and the like. The amount of the thermal polymerization initiator to be used varies depending on the polymerization conditions, the kind of the initiator, and the kind and composition of the curable compound, but may be usually in the range of 0.01 parts by mass to 10 parts by mass based on 100 parts by mass of the curable compound. The thermal polymerization initiators may be used singly or as a mixture of a plurality thereof.

(Additives)

In order to improve the durability of the photochromic pigment, increase the coloring rate, improve the fading rate, and improve the formability, the curable composition for forming a photochromic layer may further include an additive such as a surfactant, an antioxidant, a radical scavenger, a UV stabilizer, an ultraviolet absorber, a release agent, a discoloration inhibitor, an antistatic agent, a fluorescent dye, a dye, a pigment, a perfume, a plasticizer, and the like.

As the surfactant, any of nonionic, anionic, and cationic surfactants may be used, but from the viewpoint of solubility in curable compounds, nonionic surfactants may be used. Specific examples of suitable nonionic surfactants include sorbitan fatty acid esters, glycerin fatty acid esters, decaglycerin fatty acid esters, propylene glycol pentaerythritol fatty acid esters, polyoxyethylene sorbitan fatty acid esters, polyoxyethylene sorbitol fatty acid esters, polyoxyethylene glycerin fatty acid esters, polyethylene glycol fatty acid esters, polyoxyethylene alkyl ethers, polyoxyethylene phytosterol—phytostanol, polyoxyethylene polyoxypropylene alkyl ether, polyoxyethylene alkyl phenyl ether, polyoxyethylene castor oil—hydrogenated castor oil, polyoxyethylene lanolin—lanolin alcohol—beeswax derivative, polyoxyethylene alkylamine—fatty acid amides, polyoxyethylene alkylphenyl formaldehyde condensate, single-chain polyoxyethylene alkyl ethers, and the like. When using the surfactant, two or more kinds of surfactants may be used as a mixture thereof. The addition amount of the surfactant may be in the range of 0.1 parts by mass to 20 parts by mass with respect to 100 parts by mass of the curable compound.

Examples of suitable antioxidant, radical scavenger, ultraviolet stabilizer and ultraviolet absorber include a hindered amine light stabilizer, a hindered phenol antioxidant, a phenolic radical scavenger, a sulfur-containing antioxidant, a benzotriazole compound, and a benzophenone compound. These antioxidants, radical scavengers, ultraviolet stabilizers, and ultraviolet absorbers may be used in a mixture of two or more kinds thereof. Further, in using these non-polymerizable compounds, an antioxidant, a radical scavenger, a UV stabilizer, and an ultraviolet absorbers may be used in combination with a surfactant. The amount of these antioxidant, radical scavenger, ultraviolet stabilizer, and ultraviolet absorber may be in the range of 0.001 parts by mass to 20 parts by mass per 100 parts by mass of the curable compound. A known problem associated with polymeric materials is that under the presence of oxygen, oxidation-induced degradation is triggered by energy such as ultraviolet rays and heat due to the following mechanism. First, when a polymer compound is exposed to high energy such as UV irradiation, radicals are generated in the polymer. Then, these radicals serve as starting points for the generation of new radicals and peroxides. Since peroxides are generally unstable, they are easily decomposed by heat and light, and create new radicals. Thus, once oxidation starts, oxidation proceeds sequentially in a chain manner, so that the polymer material deteriorates and functional deterioration is brought about. In order to prevent oxidation caused by such a mechanism, (1) a method of deactivating the generated radicals and (2) a method of decomposing the generated peroxide into harmless substances and preventing generation of new radicals can be considered. Therefore, as an antioxidant for a polymeric material, either a compound having radical scavenging ability (radical scavenger) may be used in order to prevent oxidation by the above method (1), or a compound having peroxide decomposing ability (peroxide decomposing agent) may be used in order to prevent oxidation by the above method (2). Thus, in the present embodiment, a compound having radical scavenging ability or a compound having peroxide decomposing ability may be used as the antioxidant, but a compound having radical scavenging ability may be used as the antioxidant. Photochromic compounds absorb ultraviolet rays from sunlight, and the molecular structure thereof changes causing coloration, whereas the absorption of heat or visible light returns the compound to the original state thereof. Where oxygen is present in the path of this change, energy transfer to oxygen occurs, and oxygen radicals with strong oxidizing power are generated. Therefore, by scavenging such oxygen radicals with a compound having radical scavenging ability, it is possible to effectively prevent oxidation in the photochromic layer. Further, since the addition of a radical scavenger can suppress the progress of radical polymerization, the addition of a radical scavenger is also effective in terms of forming a flexible photochromic layer. From the above viewpoint, Example of additives include hindered amine compounds and hindered phenol compounds. Since the abovementioned compounds can exert radical scavenging ability, they can contribute to the formation of a flexible photochromic layer and can prevent oxidation of the obtained photochromic layer and improve durability. Further, by adding a hindered amine compound or a hindered phenol compound, it is possible to prevent deterioration of the photochromic pigment during curing. As the hindered amine compound and the hindered phenol compound, known compounds can be used without any limitation. Among the hindered amine compounds, compounds exhibiting the effect of preventing deterioration of photochromic pigments, especially when used for coating, can be exemplified by bis(1,2,2,6,6-pentamethyl-4-piperidyl) sebacate, ADK STAB LA-52, LA-62, LA-77, LA-82 (Asahi Denka Co., Ltd.), and the like. Examples of hindered phenol compound include dibutyl hydroxytoluene (BHT). The addition amount thereof is, for example, in the range of 0.001 parts by mass to 20 parts by mass, may be in the range of 0.1 parts by mass to 10 parts by mass, and may be in the range of 1 part by mass to 5 parts by mass relative to 100 parts by mass of the curable compound. Various additives such as the above-described compounds having radical scavenging ability can be added to the curable composition for forming a photochromic layer, but it is also possible to add such additives by impregnation treatment or the like after forming the photochromic layer. In this case, the compound having radical scavenging ability from the surface on the object side is impregnated. A surfactant may be included, a leveling agent and the like in the curable composition for forming a photochromic layer, in order to improve the uniformity at the time of film formation, and a silicone-fluorine type leveling agent having a leveling property may be added. The addition amount thereof is not particularly limited, but it is usually 0.01% by mass to 1.0% by mass, may be 0.05% by mass to 0.5% by mass, based on the total amount of the curable composition for forming a photochromic layer.

An additive may be exemplified by a pyridine ring-containing compound. The pyridine ring-containing compound is an additive capable of improving the durability of the photochromic layer by preventing the oxidation thereof. From the viewpoint of further improving the durability of the pyridine ring-containing compound and the photochromic layer, a hindered amine may be used. Here, the hindered amine is a compound having the following structure in a molecule:

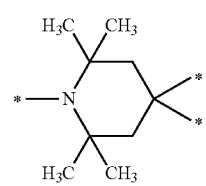

[C2]

this structure being bonded to an atom such as a hydrogen atom or another structure at positions represented by *. The hindered amine may be a polymer including the abovementioned structure in one or both of the main chain and the side chain. Regardless of whether the piperidine ring-containing compound is a hindered amine or not, the compound may be a polymer including a piperidine ring in one or both of the main chain and the side chain. Also, the piperidine ring contained may be substituted by a substituent such as an alkyl group as in the abovementioned structure.

The molecular weight of the piperidine ring-containing compound is not particularly limited, but it may be, for example, 4000 or less. The molecular weight of the piperidine ring-containing compound can be less than 1000 in one embodiment and 1000 or more in another embodiment. Further, the molecular weight of the piperidine ring-containing compound may be, for example, 100 or more, but may be less than 100. The molecular weight refers to the weight average molecular weight determined by gel permeation chromatography (GPC) in terms of polystyrene or the molecular weight distribution within the above range for a polymer (multimer). Further, the average molecular weight described in this description refers to the weight average molecular weight determined as described above.

The piperidine ring-containing compound may be contained in an amount of 0.001 parts by mass to 20 parts by mass, 0.1 parts by mass to 10 parts by mass, or 1 part by mass to 5 parts by mass, based on 100 parts by mass of the curable compound in the curable composition for forming a photochromic layer. The piperidine ring-containing compound may be added only to the curable composition for forming a photochromic layer or may be added to the below described composition for forming a function layer, without adding to the curable composition for forming a photochromic layer, or may be added to both compositions.

The photochromic layer can be formed by coating a curable composition for forming a photochromic layer which includes the above-described components on the surface of an intermediate layer and curing the composition. The method for preparing the curable composition for forming a photochromic layer is not particularly limited and can be performed by weighing and mixing predetermined amounts of the components. The order of addition of the components is not particularly limited, and all components may be added at the same time and mixed. The curable composition for forming a photochromic layer may have a viscosity at 25° C. of 20 mPa·S to 500 mPa·S, 50 mPa·S to 300 mPa·S, or 60 mPa·S to 200 mPa·S. With this viscosity range, the curable composition for forming a photochromic layer is ready to be coated, and a photochromic layer having a desired thickness can be easily obtained. Coating of the curable composition for forming a photochromic layer can be performed by a known coating method such as a spin coating method.

After coating the curable composition for forming a photochromic layer on the intermediate layer, curing treatment (light irradiation, heating, and the like) corresponding to the kind of the curable compound contained in the composition is performed, thereby making it possible to form a photochromic layer and impart a dimming function to the spectacle lens. The curing treatment can be performed by a known method. From the viewpoint of satisfactorily exhibiting photochromic properties, the thickness of the photochromic layer may be 10 μm or more, and may be 20 μm to 60 μm.

<Formation of Intermediate Layer>

The intermediate layer is formed between the polarizing layer and the photochromic layer to enhance the durability of the photochromic layer.

The intermediate layer may be a layer including at least a resin. The resin may be an aqueous resin. In the present description, the term "aqueous resin" refers to a resin having a property of solidifying at least when an aqueous coating liquid (aqueous resin composition) including the resin and an aqueous solvent is dried. The layer formed by drying and solidifying the aqueous resin composition is an aqueous resin layer.

The aqueous solvent contained in the aqueous resin composition is, for example, water or a mixture of water and a polar solvent, and may be water. From the viewpoint of liquid stability and film forming property, the solid content concentration of the aqueous resin composition may be 1% by mass to 62% by mass, and may be 5% by mass to 38% by mass. In addition to the aqueous resin, the aqueous resin composition may include, if necessary, additives such as an antioxidant, a dispersant, a plasticizer, and the like. Further, a commercially available aqueous resin composition diluted with a solvent such as water, alcohol, propylene glycol monomethyl ether or the like may be used.

The aqueous resin composition may include the aqueous resin in a state of being dissolved or dispersed as fine particles (for example colloidal particles) in an aqueous solvent. Among the aqueous resin compositions, a dispersion in which the aqueous resin is dispersed as fine particles in an aqueous solvent (for example in water) may have better. In this case, from the viewpoint of the dispersion stability of the composition, the particles of the aqueous resin may have a diameter of 0.3 μm or less. Further, from the viewpoint of stability, the pH of the aqueous resin composition may be about 5.5 to 9.0 at 25° C. From the viewpoint of coating suitability, the viscosity at 25° C. may be 5 mPa·S to 500 mPa·S, and may be 10 mPa·S to 50 mPa·S.

Examples of the aqueous resin may include an aqueous polyurethane resin, an aqueous acrylic resin, an aqueous epoxy resin, and the like, and from the viewpoint of more effectively preventing or reducing peeling between the polarizing layer and the photochromic layer, an aqueous polyurethane resin may have better. That is, the intermediate layer may be an aqueous polyurethane resin layer. An aqueous resin composition including an aqueous polyurethane resin can be obtained by, for example, urethanizing a polymer polyol compound and an organic polyisocyanate compound, optionally, together with a chain extender in a solvent inert to the reaction and having a high affinity for water to prepare a prepolymer, neutralizing the prepolymer, then dispersing the prepolymer in an aqueous solvent including a chain extender, and increasing the molecular weight. Examples of commercially available aqueous polyurethanes include "ADEKA BONTIGHTER" series manufactured by Asahi Denka Co., Ltd., "OLESTAR" series manufactured by Mitsui Toatsu Chemicals, Inc., "VONDIC" series and "HYDRAN" series manufactured by Dainippon Ink and Chemicals, Incorporated, "IMPRANIL" series manufactured by Bayer AG, "SOFLANNATE" series manufactured by Nippon Soflan Co., Ltd., "POIZ" series manufactured by Kao Corporation, "SANPLENE" series manufactured by Sanyo Chemical Industries Ltd., "AIZELAX" series manufactured by Hodogaya Chemical Co., Ltd., "SUPERFLEX" series manufactured by DKS Co. Ltd., "NeoRez" series manufactured by Zeneca Co., Ltd., and the like.

A composition obtained by dispersing a terminated isocyanate prepolymer having a polyol such as a polyester polyol, a polyether polyol, a polycarbonate polyol or the like as a basic skeleton and having an anionic group such as a carboxyl group, a sulfone group and the like in an aqueous solvent may be as the aqueous resin composition including an aqueous polyurethane resin.

An aqueous resin layer may be formed as an intermediate layer on the polarizing layer by applying and drying an aqueous resin composition described above on the surface of the polarizing layer after the treatment with the silane coupling agent. As a coating method, a well-known coating method such as a dipping method, a spin coating method, or the like can be used. The coating conditions may be appropriately set to form an intermediate layer having a desired thickness. Regardless of whether the intermediate layer is an aqueous resin layer or not, from the viewpoint of more effectively preventing or reducing peeling between the polarizing layer and the photochromic layer, the thickness of the intermediate layer may be in the range of 5 μm to 20 μm, and may be in the range of 7 μm to 10 μm. The intermediate layer may be composed of only one layer or two or more layers having different compositions. When two or more layers are provided between the polarizing layer and the photochromic layer, the thickness of the intermediate layer means the total thickness of the two or more layers. Before the application of the aqueous resin composition, the surface of the polarizing layer, which is the surface to be coated, can be subjected to one or more types of well-known treatment such as chemical treatment with an acid, an alkali, various organic solvents, and the like, physical treatment with plasma, ultraviolet light, ozone, and the like, detergent treatment using various detergents, and the like.

By drying the aqueous resin composition after coating, it is possible to form the aqueous resin layer as an intermediate layer. This drying can be performed, for example, by placing a member including a polarizing layer, on which the aqueous resin composition has been coated, for 5 min to 24 h in an atmosphere at room temperature to 100° C. The room temperature refers to the ambient temperature without temperature control such as heating and cooling and is generally about 15° C. to 25° C., but it is not limited to this range and may vary depending on weather and season.

The aqueous resin layer has been described as a embodiment of the intermediate layer, but the intermediate layer also may be, for example, a cured layer formed by curing the curable composition.

[Spectacles]

As compared with the spectacle lens obtained by the insert molding of the conventional polarizing film, the spectacle lens described above can expand the range of frame selection.

The spectacles according to an embodiment of the present disclosure include the spectacle lens and a frame to which the spectacle lens is attached.

The frame includes, for example, a pair of rims, a bridge provided between the rims, and a pair of temples provided at one end of the rim.

The rim may be a half rim. The spectacle lens according to one embodiment of the present invention may be used even with a frame having a half rim.

The frame may be a so-called rimless frame. In this case, for example, the spectacles have a pair of spectacle lenses, a bridge provided between the spectacle lenses, and a pair of temples provided at one end of the spectacle lens.

EXAMPLES

Hereinafter, the present disclosure will be further described by examples. However, the present disclosure is not limited to the modes shown in the examples.

Example 1

Preparation of Polarizing Lens
(1) Formation of Alignment Layer

A hard coat layer having a thickness of 2 μm was formed by using a meniscus-shaped polythiourethane lens (trade name EYAS, manufactured by HOYA Corporation, center thickness 2.0 mm, diameter 75 mm, convex surface curve (average value) about +0.8) as a lens substrate, preparing a hard coat composition according to the method described in (6) hereinbelow, coating the hard coat composition on the convex surface of the lens substrate by a spin coating method, heating for 120 min at a heating temperature of 90° C., and curing.

A $SiO_2$ film having a thickness of about 0.2 μm was formed on the hard coat layer by a vacuum deposition method.

Unidirectional rubbing treatment was performed with respect to the formed $SiO_2$ film by unidirectionally rotating a roller with nylon wrapped therearound while pressing the roller against the film with constant pressure. Thus, an alignment layer was formed on the convex surface of the lens substrate with the hard coat layer.
(2) Formation of Polarizing Layer
(2-1) Application of an Aqueous Coating Liquid for Forming a Polarizing Layer After drying, a water-soluble dichroic pigment (Varilight solution 2S, trade name, manufactured by Sterling Optics Incorporated, an aqueous solution of about 4% by mass of an active ingredient) was diluted with water to prepare a coating liquid having a dichroic pigment concentration adjusted to 0.28% by mass, and the coating liquid was applied by a spin coating method. The application by the spin coating method was carried out by supplying the coating liquid at a rotation speed of 285 rpm and holding for 40 sec.
(2-2) Water-Insolubilization Treatment Next, an aqueous solution having a concentration of iron chloride of 0.15 M, a concentration of calcium hydroxide of 0.2 M, and pH 3.5 was prepared, and the lens obtained above was immersed in this aqueous solution for approximately 30 sec, pulled out, and washed thoroughly with pure water. Through this step, the water-soluble pigment was converted into a hardly soluble pigment.
(2-3) Silane Coupling Agent Treatment After the above (2-2), the lens was immersed in a 10% by mass aqueous solution of γ-aminopropyltriethoxysilane for 15 min, then washed with pure water three times, heat-treated in a heating furnace (furnace temperature 85° C.) for 30 min, and then taken out from the heating furnace and cooled to room temperature.

After the cooling, the lens was immersed in a 2% by mass aqueous solution of γ-glycidoxypropyltrimethoxysilane for 30 min and then heat-treated in a heating furnace (furnace temperature 60° C.) for 30 min. After the heat treatment, the lens was taken out from the heating furnace and cooled to room temperature.

After the silane coupling treatment, the thickness of the formed polarizing layer was 1 μm.
(3) Formation of Aqueous Polyurethane Resin Layer (Intermediate Layer)

An aqueous polyurethane resin layer having a thickness of about 7 μm was formed by coating an aqueous dispersion of a polyurethane having an acrylic group introduced into a polyurethane skeleton (polycarbonate polyol-based polyurethane emulsion, viscosity 100 mPa·s, solid content concentration 38% by mass) as an aqueous resin composition on the surface of the polarizing layer obtained as described in (2) hereinabove by a spin coating method, and then air-drying for 15 min in an atmosphere at a temperature of 25° C. and a relative humidity of 50%.
(4) Preparation of Curable Composition for Forming Photochromic Layer A radically polymerizable composition including 20 parts by mass of trimethylolpropane trimethacrylate, 35 parts by mass of BPE oligomer (2,2-bis(4-methacryloyloxypolyethoxyphenyl)propane), 10% by mass of EB6A (polyester oligomer hexaacrylate), 10 parts by mass of polyethylene glycol diacrylate having an average molecular weight of 532, and 10 parts by mass of glycidyl methacrylate was prepared in a plastic container. A total of 3 parts by mass of chromene 1 as a photochromic pigment, 5 parts by mass of a piperidine ring-containing compound (hindered amine (SANOL LS765, manufactured by Sankyo Co., Ltd. (bis (1,2,2,6,6-pentamethyl-4-piperidyl) sebacade, methyl (1,2,2,6,6-pentamethyl-4-piperidyl) sebacade, average molecular weight 467))), and 0.6 parts by mass of CGI-1870 (manufactured by BASF SE) as a UV polymerization initiator were added to 100 parts by mass of the radically polymerizable composition, followed by thorough stirring and mixing. A total of 6 parts by mass of γ-methacryloyloxypropyltrimethoxysilane (KBM 503, manufactured by Shin-Etsu Chemical Co., Ltd.) was added dropwise while stirring to the obtained composition. Defoaming was thereafter performed for 2 min with a rotation-revolution type stirring and defoaming apparatus to obtain a curable composition for forming a photochromic layer.

(5) Formation of Photochromic Layer

The curable composition for forming a photochromic layer which was prepared in (4) hereinabove was coated on the aqueous polyurethane resin layer formed in (3) hereinabove by a spin coating method. This lens was then irradiated with ultraviolet rays having a wavelength of 405 nm with a UV lamp (D bulb) at an integrated quantity of light of 3240 mJ/cm$^2$ (180 mW/cm$^2$) for 3 min in a nitrogen atmosphere (oxygen concentration of 500 ppm or less), and then effect treatment was performed for 150 min at a heating temperature of 80° C. to form a photochromic layer having a thickness of about 40 μm.

(6) Preparation of Hard Coat Composition

A total of 17 parts by mass of γ-glycidoxypropyltrimethoxysilane, 30 parts by mass of methanol, and 28 parts by mass of water-dispersed colloidal silica (solid content 40% by mass, average particle diameter 15 μm) were placed in a glass container equipped with a magnetic stirrer, thoroughly mixed, and stirred for 24 h at a flow temperature of 5° C. Next, 15 parts by mass of propylene glycol monomethyl ether, 0.05 parts by mass of a silicone type surfactant, and 1.5 parts by mass of aluminum acetylacetonate as a curing agent were added and thoroughly stirred, followed by filtration to prepare a hard coat composition.

(7) Formation of Hard Coat Layer

The hard coat composition prepared in (6) hereinabove was coated by a dipping method (pulling rate 20 cm/min) on the photochromic layer formed in (5) hereinabove, and then cured by heating for 120 min at a heating temperature of 90° C. to form a hard coat layer having a thickness of 3 μm.

Through the above steps, a spectacle glass was obtained in which the hard coat layer, the alignment layer, the polarizing layer (treated with a silane coupling agent), the aqueous polyurethane resin layer, the photochromic layer, and the hard coat layer were provided in this order on the lens substrate.

Example 2

A spectacle lens was obtained by the same method as in Example 1 except that the concentration of the dichroic pigment in the coating liquid was 0.46% by mass.

Example 3

A spectacle lens was obtained by the same method as in Example 1 except that the concentration of the dichroic pigment in the coating liquid was 1.04% by mass.

Comparative Example 1

A spectacle lens was obtained by the same method as in Example 1 except that the concentration of the dichroic pigment in the coating liquid was 1.72% by mass.

Comparative Example 2

A spectacle lens was obtained by the same method as in Example 1 except that the concentration of the dichroic pigment in the coating liquid was 2.84% by mass.

Comparative Example 3

A spectacle lens was obtained by the same method as in Example 1 except that the water-soluble dichroic pigment (trade name Varilight solution 2S manufactured by Sterling Optics Incorporated, an aqueous solution with an active ingredient concentration of about 4% by mass) was used as it was, without dilution with water, to adjust the concentration of the dichroic pigment in the coating liquid to 4% by mass.

Comparative Example 4

A spectacle lens was obtained in the same manner as in Comparative Example 1 except that the aqueous coating liquid for forming a polarizing layer was supplied at a rotation speed of 390 rpm.

Comparative Example 5

A spectacle lens was obtained in the same manner as in Comparative Example 1 except that the aqueous coating liquid for forming a polarizing layer was supplied at a rotation speed of 420 rpm.

Comparative Example 6

A spectacle lens was obtained in the same manner as in Comparative Example 1 except that the aqueous coating liquid for forming a polarizing layer was supplied at a rotation speed of 450 rpm.

Example 4

A spectacle lens was obtained in the same manner as in Example 1 except that the aqueous coating liquid for forming a polarizing layer was supplied at a rotation speed of 390 rpm.

Example 5

A spectacle lens was obtained in the same manner as in Example 1 except that the aqueous coating liquid for forming a polarizing layer was supplied at a rotation speed of 450 rpm.

Measuring Methods

With respect to the spectacle lenses prepared in Examples and Comparative Examples, various measurements were carried out by the following methods.

(1) Measurement of Luminous Transmittance

The luminous transmittance was measured according to "6.6. Polarization Lens Test Method" of JIS T 7333:2005. Where a lens had a photochromic layer, the measurement was performed according to "6.6. Polarization Lens Test Method" after "a state with a light color" was obtained by the method prescribed in "6.5.3.1".

(2) Degree of Polarization

The degree of polarization ($P_{eff}$) was evaluated by the following formula by using an ultraviolet—visible—near-infrared spectrophotometer "V-660" (manufactured by JASCO Corporation) to determine a luminous transmittance ($T_\parallel$) at the time when the transmission axis of the polarizing element was in a parallel direction with respect to the linearly polarized light and a luminous transmittance ($T_\perp$) at the time when the transmission axis of the polarizing element was in the orthogonal direction according to ISO 8980-3. The luminous transmittance ($T_\parallel$) and the luminous transmittance ($T_\perp$) were measured using a visible spectrophotometer and a polarizer (Glan-Thompson prism). The measurement light was made incident from the lens convex surface side.

$$P_{\mathit{eff}}(\%)=[(T_\parallel-T_\perp)/(T_\parallel+T_\perp)]\times 100$$

The above results are shown in Table 1.

TABLE 1

| | Concentration of dichroic pigment (% by mass) | Rotation speed (rpm) | Luminous transmittance (%) | Degree of polarization (%) |
|---|---|---|---|---|
| Example 1 | 0.28 | 285 | 82 | 19 |
| Example 2 | 0.46 | 285 | 55 | 51 |
| Example 3 | 1.04 | 285 | 49 | 65 |
| Comparative Example 1 | 1.72 | 285 | 41 | 86 |
| Comparative Example 2 | 2.84 | 285 | 35 | 97 |
| Comparative Example 3 | 4.00 | 285 | 33 | 99 |
| Comparative Example 4 | 1.72 | 390 | 50 | 69 |
| Comparative Example 5 | 1.72 | 420 | 52 | 65 |
| Comparative Example 6 | 1.72 | 450 | 54 | 59 |
| Example 4 | 0.28 | 390 | 85 | 16 |
| Example 5 | 0.28 | 450 | 85 | 15 |

From the comparison between Examples and Comparative Examples in Table 1, it was confirmed that a spectacle lens having high luminous transmittance and sufficient polarizing function is obtained by forming a polarizing layer by applying a coating liquid containing 0.04% by mass to 1.5% by mass of a dichroic pigment by a spin coating method at a speed of 200 rpm to 600 rpm.

Also, from the comparison of the group of Comparative Examples 3, 4, 5, and 6 and the group of Examples 1, 4, and 5 in Table 1, it was confirmed that the lower the concentration of the dichroic pigment, the smaller the effect produced by the change in the rotation speed on the luminous transmittance.

Finally, the embodiments of the present disclosure will be summarized.

A spectacle lens having high luminous transmittance and high polarizing function can be realized by forming a polarizing layer by applying a coating liquid containing 0.04% by mass to 1.5% by mass of a dichroic pigment by a spin coating method at a speed of 200 rpm to 600 rpm on a rubbing-treated surface.

By using a coating liquid having a low concentration of 0.04% by mass to 1.5% by mass, it is possible to reduce variations in the degree of polarization for each production lot.

In addition, by applying a coating liquid with a low concentration of the dichroic pigment to the rubbing-treated surface, it is possible to maintain a high degree of polarization for reducing glare while realizing at the same time a high transmittance.

The luminous transmittance in the spectacle lens can be improved by newly developing a material itself (for example, a dichroic pigment), but a disadvantage of newly developing a material itself is that it is costly and time-consuming. By contrast, according to an embodiment of the present disclosure, it is possible to improve the luminous transmittance of the spectacle lens by changing the manufacturing conditions while using the existing material.

In order to form the lens substrate layer on the front and rear surfaces of the polarizing film as described in PTL 2, a manufacturing method is usually used in which the peripheral edge of a polarizing film which is pressure-molded in advance in a semispherical shape is held on the inner peripheral side of a ring-shaped gasket having the same diameter as the lens substrate, a pair of concave and convex molds for forming lens surfaces is integrally fixed to the gasket at a predetermined distance from the front and rear surfaces of the polarizing film, a monomer is injected into a cavity (void) that sets the lens thickness between the pair of molds, a polymerization reaction is carried out by holding at a required temperature for a required time, and the cured resin and a polarizing element are integrally molded. The drawback of this technique is that it takes time to cure the resin and, therefore, a long time elapses from order reception to delivery. Another drawback is that large restrictions are placed on lens processing (drilling is impossible, large-scale machining is impossible, and the like) after resin curing in order to avoid damage to the polarizing film, and the degree of freedom of frame selection is low. Meanwhile, according to one embodiment of the present disclosure in which a coating liquid containing a dichroic pigment is applied onto a lens substrate to form a polarizing layer, shorter delivery times can be realized and the range of frame selection can be expanded.

By forming a photochromic layer including a photochromic pigment, it is possible to obtain a spectacle lens having both polarization performance and dimming performance. Since a decrease in luminous transmittance due to the polarizing layer can be suppressed, a high luminous transmittance can be obtained even though the lens has dimming performance, so that sufficient dimming performance can be obtained while maintaining a high luminous transmittance at the time of color fading.

It should be understood that the embodiments disclosed herein are exemplary in all respects and are not restrictive. The scope of the present invention is indicated not by the above description but by the claims and is intended to include meanings equivalent to claims and all changes within the scope of the claims.

The invention claimed is:

1. A method for manufacturing a spectacle lens, comprising forming a polarizing layer by applying an aqueous coating liquid containing 0.1% by mass to 0.5% by mass of a dichroic pigment by a spin coating method at a speed of 200 rpm to 600 rpm on a rubbing-treated surface.

2. The method for manufacturing a spectacle lens according to claim 1, wherein the rubbing-treated surface is formed directly or via another layer on a lens substrate.

3. The method for manufacturing a spectacle lens according to claim 1, wherein
   an alignment layer is formed by rubbing-treating a surface of a film including an inorganic oxide, and
   the rubbing-treated surface is a surface of the alignment layer.

4. The method for manufacturing a spectacle lens according to claim 1, comprising performing immobilization treatment of the dichroic pigment to the polarizing layer.

5. The method for manufacturing a spectacle lens according to claim 4, wherein the immobilization treatment is performed by applying a silane coupling agent solution onto the polarizing layer.

6. The method for manufacturing a spectacle lens according to claim 4, comprising performing water-insolubilization treatment of the dichroic pigment in the polarizing layer before the immobilization treatment.

7. The method for manufacturing a spectacle lens according to claim 1, further comprising forming a photochromic layer including a photochromic pigment as an upper layer or a lower layer of the polarizing layer.

8. The method for manufacturing a spectacle lens according to claim 7, comprising forming an intermediate layer between the polarizing layer and the photochromic layer.

9. The method for manufacturing a spectacle lens according to claim 1, wherein the dichroic pigment is a water-soluble pigment.

10. The method for manufacturing a spectacle lens according to claim 1, wherein the dichroic pigment is selected from the group consisting of merocyanine pigments, styryl pigments, azomethine pigments, quinone pigments, perylene pigments, indigo pigments, tetrazine pigments, stilbene pigments, and benzidine pigments.

11. The method for manufacturing a spectacle lens according to claim 1, wherein the dichroic pigment is selected from the group consisting of merocyanine pigments, azomethine pigments, indigo pigments, tetrazine pigments, and benzidine pigments.

12. The method for manufacturing a spectacle lens according to claim 1, wherein the dichroic pigment is selected from the group consisting of styryl pigments, perylene pigments, and stilbene pigments.

13. The method for manufacturing a spectacle lens according to claim 1, wherein the aqueous coating liquid comprises a solvent containing water, the amount of water in the solvent being in the range of from 60% by mass to 100%.

14. The method for manufacturing a spectacle lens according to claim 1, wherein the aqueous coating liquid comprises a solvent containing water, the amount of water in the solvent being in the range of from 90% by mass to 100%.

* * * * *